June 16, 1953  E. C. GEISTERT  2,642,108
SAFETY LOCKING DEVICE FOR NUTS
Filed Dec. 4, 1950

INVENTOR.
Edward C. Geistert
BY
Leonard S. Knox[?]
Attorney

Patented June 16, 1953

2,642,108

UNITED STATES PATENT OFFICE 2,642,108

SAFETY LOCKING DEVICE FOR NUTS

Edward C. Geistert, Grand Rapids, Mich., assignor to Lear, Incorporated, Chicago, Ill., a corporation of Illinois Application December 4, 1950, Serial No. 198,937

3 Claims. (Cl. 151—59)

This invention relates to a nut-locking device. In particular it has reference to a device intended for manual engagement and disengagement and permanently associated with the assembly of which the nut is a part, the nut so functioning as to necessitate reasonably frequent removal thereof for servicing requirements of the parts secured by the nut.

By way of example the invention will be described as embodied in a flexible shaft assembly, although from what follows it will become evident that the same is not so limited in its application.

In U. S. Patent No. 2,319,463, granted on May 18, 1943, to William P. Lear, there is shown a flexible shafting organization to which the instant device is particularly adaptable, and reference is particularly made to Figure 5 thereof. For the control of engine cowl flaps and other movable parts of aircraft, it is often the practice to couple driven components together and to the prime mover by flexible shafting. Moreover for reasons of servicing it is desirable also to provide means for rapidly disconnecting a length of flexible shafting from the housing containing the driving or driven elements, and as illustrated in said patent. The conventional form of such disconnect comprises an externally threaded hollow post extending from the housing and adapted to be abutted by a flange forming one end of the ferrule with which a length of flexible shafting frequently is terminated, the end of the flexible shaft core passing inside the post, and being coupled to the components within the housing by means of a splined connection or its equivalent. A nut rotatable with respect to the ferrule is threadedly engaged with the post and bears down on the flange to secure the flexible shafting organization to the housing.

Government specifications for aircraft prescribe that such swivel nuts be locked against unintended rotation. In these cases such locking is accomplished by means of a so-called safety wire, the nut being drilled for passage of a loop of wire, the ends of which are then passed through another convenient hole and twisted together. It will therefore be appreciated that removal and replacement of such wire is a tedious operation requiring tools.

In the case of many installations of such drives in aircraft, the end connections of the shafting are quite difficult of access so that the use of tools is decidedly awkward, if not entirely ruled out. Hence special access panels rather than simple hand-holes, must be provided. Additionally, even though a shafting connection may be exposed to view, there is frequently no more room than will accommodate a person's fingers.

In view of the foregoing, the principal object of the invention is to provide a locking device for the purpose stated and in substitution of twisted safety wiring, which may be instantly engaged and disengaged with respect to the nut purely manually.

Another object is to provide a locking device in accordance with the foregoing which may be adapted to present designs of driving and driven units with no alteration in the shaft assembly per se, and which may be quickly adapted to such units already installed.

Still another object is to provide a device as aforesaid which, when moved from nut-locking position, remains associated with the assembly to guard against loss.

A further object is to provide a device as aforesaid which may be manufactured at low cost.

In the drawings which show a preferred embodiment of the invention:

Figure 1:
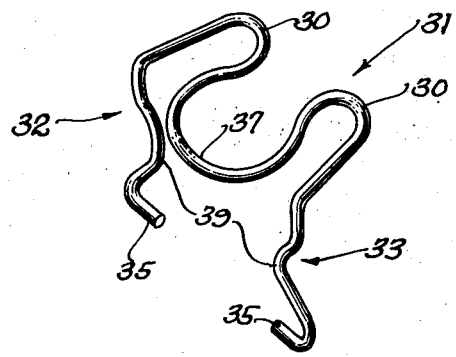
Fig. 1 shows a perspective view of the locking device apart from the assembly.

Generally regarded the invention device contemplates a bail-like, formed wire, resilient member pivoted in a fixed part of the assembly to allow the same to be swung into or out of engaging relation with the nut to be locked. The member is arranged for convenient manipulation by the fingers, and yet for firm engagement, to insure against accidental dislodgment under vibration. One portion of the member is provided with a loop for "snap on" engagement with a terminal ferrule of a flexible shaft or other component with which the nut is associated, and thus to retain the member in operative position, and other portions of the member are so constructed as to engage flat opposed faces of the nut to prevent rotation thereof or frictionally to engage knurling or other types of nut-rotating means. Desirably the ferrule engaging portion is arranged for juxtaposition with the outer end face of the nut.

Referring to the drawings which show a typical environment in which the invention device may be embodied, there is shown a housing 10 which contains a rotatable element for connection with the female splined end 11 of a flexible shaft core 12, the core 12 and end 11 being mutually attached by a pin 15. It will be understood that the mating male spline (not shown) forms part of the rotatable element in the housing 10. Shaft 12 is carried in a flexible spirally wound housing 16, terminating in a ferrule 14 having a flange 17 arranged to abut a washer 18, which latter is in abutment with the end of an externally threaded post 21 projecting from a connecting flange 22. Flange 22 is permanently attached to the housing 10 by screws (not shown) passing through apertures 23. For detachably securing the flexible shaft assembly to the post 21 there is provided a nut 25, in this case illustrated as hexagonal, although any polygonal outline may be used insofar as the invention is concerned. In order that a wrench may be employed, if desired, the polygonal nut would generally comprise an even number of sides or flats. It is however within the contemplation of the invention that the nut 25 may be cylindrical, with grooves or holes for a spanner, or it may be knurled for manual rotation. Nut 25 is provided with an inwardly projecting rim 27 adapted to overlie the flange 17. For further details of a flexible shaft drive of the type heretofore detailed, reference is made to said U. S. Patent No. 2,319,463.

In view of what has been stated, it will have been obvious that to assemble the flexible shaft assembly with the housing the splined end 11 will be fitted over its mating splined shaft, and the nut 25 screwed into position to lock the flexible shaft assembly in operative position as shown.

Where the assembly is subject to vibration provision must be made to prevent unintended rotation of the nut, and possibly complete disengagement of the flexible shaft from the parts with which it is connected. Such precaution is of salient importance in aircraft applications wherein vibration is severe. Moreover many such applications are difficult of access by the use of tools. Accordingly the use of locking wires as referred to hereinabove is contraindicated, as is the use of conventional lock washers which would require a wrench for tightening and loosening the nut 25. By the use of the invention device the nut may be tightened by hand in most cases and still be secure enough to perform its intended function. Such device will now be detailed.

Turning to Fig. 1 the device comprises a bail-like member of resilient material, e. g. music wire, having a transversely extending part 31 and depending legs 32 and 33 which, being symmetrical opposites, will sometimes be alluded to by reference to one only. Preferably, for inexpensive manufacture, the member comprises wire formed in dies in any conventional wire-forming machine and in one piece.

Figure 2:
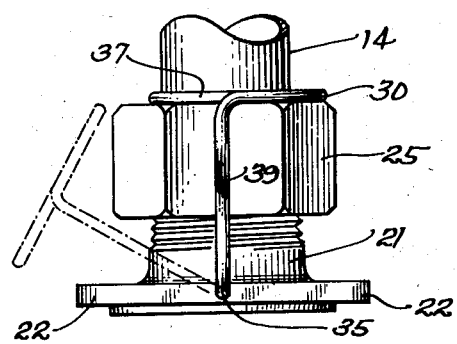
Fig. 2 shows a side elevational view of an assembly including the device.
Figure 4:
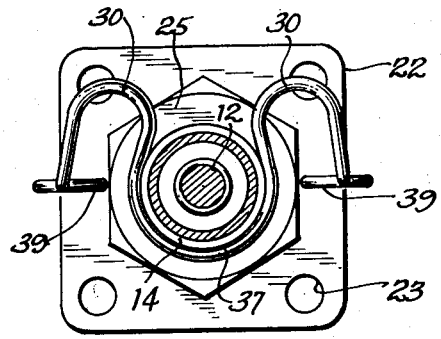
Fig. 4 shows a top plan view of the assembly of Fig. 3.
Figure 5:
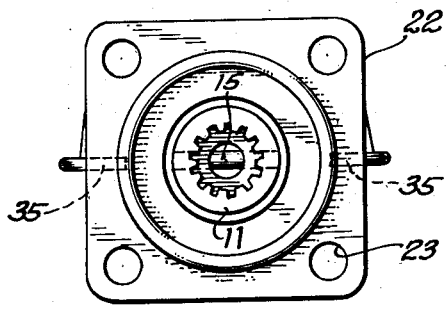
Fig. 5 shows a bottom plan view of the assembly of Fig. 3.

At its lower end the legs 32 and 33 are bent inwardly to form pivots 35—35 adapted to be rotatably engaged in apertures or recesses 36—36, both latter being drilled in alignment in opposite edges of the flange 22, whereby the device may be swung into and out of operative position and, when out of operative position is safely retained against loss (Fig. 2). The part 31 is deformed to form a loop or bight 37 which extends circularly for somewhat more than 180° and is of an inner diameter less than the outer diameter of the shaft ferrule 14 whereon the loop 37 is to be snapped. Thus the throat or entering end of the loop 37 which is consequently less than the diameter thereof may be momentarily increased while the device is pressed into operative position whereafter the constrictive force of the loop will maintain such position notwithstanding vibrationary forces (Fig. 4).

Figure 3:
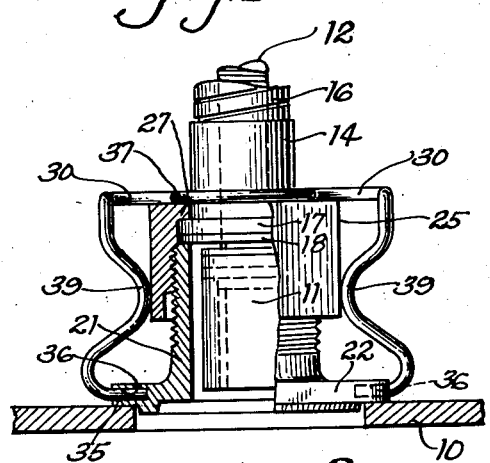
Fig. 3 shows a front elevational view of the assembly with certain parts cross-sectioned.

The ends of loop 37 are returned upon themselves horizontally as at 30—30 to merge with the legs 32 and 33, which are substantially vertical. Legs 32 and 33 are each provided with an inwardly directed concave detent or hump 39 which are so arranged that the minimum distance between them is substantially equal to the face to face dimension of a pair of opposed flat surfaces of the nut 25. Accordingly when the device is in operative position the humps 39—39 are engaged with a pair of opposed flats to forestall rotation of the nut (Fig. 3). If it should happen that suitable tightening of the nut brings opposite corners of the same in line with the humps 39—39 the circular form of the wire will militate against permanent engagement being maintained in that precise relationship. In such incidental cases the resiliency of the device will cause the legs 32 and 33 to deform themselves so as to re-orient the humps 39—39 on those flats of the nuts nearest thereto.

While the primary function of the bight 37 is to lock the device with respect to the ferrule 14, I preferably arrange that this bight shall be positioned as closely as possible to the upper end face of the nut 25. Thus there is additional provision tending to prevent unscrewing of the nut. Moreover should a nut lacking a pair of opposed flats be employed the bight 37 substitutes for the function of the humps 39, although, if a cylindrical nut having a knurled or otherwise roughened periphery is employed the hump 39 would contribute materially by frictional engagement with such roughened surface. Furthermore if the nut is provided with a plurality of grooves for engagement by a spanner or the like the humps 39 would find reception therein.

It will be observed that the loop portions 30—30 joining the bight 37 to the legs 32 and 33 are so constructed as to overhang the periphery of the nut 25 (Fig. 4) in order that the same may serve for dislodgment of the device from locking position. Such loop portions 30—30 are rounded and are readily accessible by the fingers to permit relatively effortless manipulation thereby.

By virtue of the point contact of the humps 39—39 with the periphery of the nut 25 it is not necessary that the nut be so positioned angularly that a flat thereof is precisely perpendicular to the plane including the humps 39—39, since suitable resistance to reverse rotation of the nut is afforded by the gripping action exerted between the humps, regardless of the angular relationship of the plane of a flat with the plane of the legs 32 and 33.

From the foregoing it will have become apparent that I have provided a locking device for the purpose indicated which is low in cost, easily applied to nearly all applications employing a hexagonal, knurled or other type of nut, is capable of being locked or unlocked digitally, can be manipulated in seconds as contrasted to prior arrangements such as safety wiring, and can be used in very close quarters.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A device for releasably locking a nut in engagement with a threaded member and for detachably securing an element to said member, said nut having an axial opening for passage of said element therethrough and at least one pair of oppositely positioned flat surfaces on the periphery thereof comprising in combination, means for providing a pair of substantially diametrically disposed recesses in said threaded member, and a bail-like member of resilient material formed with two oppositely disposed leg members and a connecting portion positioned between the ends of said leg members, the other ends of said leg members provided with inwardly directed parts for pivotally engaging said recesses, said connecting portion formed with a substantially U-shaped configuration for frictionally embracing said element, and each of said leg members having an inwardly-deformed portion intermediate the ends thereof for contacting one of said flat surfaces of said nut when the bail-like member is rotated in said recesses to position the U-shaped configuration of the connecting portion in operative relation with said element.

2. A device as defined in claim 1 wherein said inwardly-deformed portion is of arcuate configuration.

3. A device as defined in claim 1 wherein said inwardly-deformed portion comprises a convex hump.

EDWARD C. GEISTERT.

References Cited in the file of this patent

UNITED STATES PATENTS

| Number | Name | Date |
|---|---|---|
| 252,655 | Frederick | Jan. 24, 1882 |
| 534,864 | De Steiger | Feb. 26, 1895 |
| 610,721 | DeQuillfeldt | Sept. 13, 1898 |
| 793,209 | Miller | June 20, 1905 |
| 874,378 | Allen | Dec. 24, 1907 |
| 1,288,256 | Steiger | Dec. 17, 1918 |
| 1,325,826 | Baker | Dec. 13, 1919 |
| 2,319,463 | Lear | May 18, 1943 |
| 2,494,774 | Messick | Jan. 17, 1950 |